United States Patent
Kyodo

[11] Patent Number: 5,711,736
[45] Date of Patent: Jan. 27, 1998

[54] MOTOR APPARATUS WITH REDUCTION GEAR

[75] Inventor: Yasumasa Kyodo, Tokyo, Japan

[73] Assignee: Sony Corporation, Tokyo, Japan

[21] Appl. No.: 592,401

[22] PCT Filed: Jun. 2, 1995

[86] PCT No.: PCT/JP95/01092

§ 371 Date: Mar. 8, 1996

§ 102(e) Date: Mar. 8, 1996

[87] PCT Pub. No.: WO95/34116

PCT Pub. Date: Dec. 14, 1995

[30] Foreign Application Priority Data

Jun. 3, 1994 [JP] Japan .................................. 6-144071

[51] Int. Cl.$^6$ ................................................ H02K 7/116
[52] U.S. Cl. .................................................... 475/149
[58] Field of Search ................................ 475/149, 183, 475/341, 345

[56] References Cited

U.S. PATENT DOCUMENTS 4,994,004  2/1991  Meijer et al. ........................... 475/149

FOREIGN PATENT DOCUMENTS

3124765  12/1991  Japan .
5328664  12/1993  Japan .

*Primary Examiner*—Dirk Wright
*Attorney, Agent, or Firm*—Ronald P. Kananen

[57] ABSTRACT

A motor apparatus with reduction gear in which a motor portion is disposed around the center shaft and a reduction gear portion is disposed at the outer circumference thereof so that the thickness in the direction of the axis of rotation is reduced. The motor portion of the motor apparatus is composed of a stator coil disposed around the center shaft, a rotational body rotatably supported by the center shaft, and a magnet attached to the rotational body in a manner opposite to the stator coil. Moreover, the reduction gear portion is composed of a first ring disposed at the outer periphery of the rotational body with the center thereof being caused to be substantially in correspondence with the center of rotation of the rotational body, a second ring rotatably supported with respect to the first ring with the center thereof being caused to be substantially in correspondence with the center of rotation of the rotational body, a plurality of shafts disposed at substantially equal intervals on the circumference with the center of rotation of the rotational body being as the center, and a plurality of planetary gears respectively rotatably attached at these shafts, wherein a portion of the planetary gears is rotated along the inner circumferential surface of the first ring, and the other portion of the planetary gears is rotated along the inner circumferential surface of the second ring.

4 Claims, 5 Drawing Sheets

MOTOR APPARATUS WITH REDUCTION GEAR

TECHNICAL FIELD

This invention relates to a motor apparatus with a reduction gear in which a motor portion is disposed around the center shaft and a reduction gear portion is disposed at the outer circumferential side of the motor portion to thereby reduce the number of rotations of the motor portion to provide an output of the reduced number of rotations.

BACKGROUND ART

Hitherto, in assembling; various equipment such as electric equipment, and so forth, automatic assembling robots are used. As an automatic assembling robot of this kind, there are, e.g., robots adapted for grasping or holding parts or components delivered through a parts delivery unit by an arm provided with grasping (holding) mechanism to rotationally operate the arm which has grasped or held the parts to mount them at predetermined mount positions of equipment to be assembled.

In the case of carrying out assembling of equipment by using such a robot, it is necessary to securely grasp or hold the delivered parts to precisely carry or convey them to predetermined mount positions of the equipment. In order to realize secure holding of parts and precise carrying thereof, it is necessary to precisely control the operation of the arm for holding and carrying the parts. In addition, in order to precisely control the operation of the arm, it is necessary to drive the arm by low speed and high torque.

In order to realize such a requirement to drive the arm of the robot by low speed and high torque, a motor having a reduction gear connected to the output shaft thereof is used.

As a reduction gear for reducing the number of rotations of the motor, a gear box comprised of a plurality of gears connected to each other is used. In order to obtain higher reduction gear ratio by using such gear box, it is necessary to connect a large number of gears in a multi-stage form. However, the gear box in which a large number of gears are connected in a multi-stage form would become large-sized. Further, it has been also put into practical use that a plurality of gear boxes are used. However, when such a large sized gear box or plural gear boxes is or are arranged at the output shaft side of the motor, the drive portion including the motor becomes large sized. As a result, it becomes difficult to attain miniaturization of the robot. Moreover, when a large number of gears are connected, or a plurality of gear boxes are connected, noise resulting from meshing between gears becomes large at the time of driving, thus making it difficult to constitute a silent robot. In addition, back-lash produced between respective gears becomes large, thus making it difficult to carry out precise drive control of the arm.

In order to solve such problems that the gear box has, a small reduction gear called a harmonic reduction gear which can obtain a reduction gear ratio of about 1/several tens to 1/hundred by one stage is used as a reduction gear of the motor which drives the arm of the robot. Similarly to the gear box, the harmonic reduction gear is used in the state attached to the front surface side from which the output shaft of the motor is projected so that the input/output shafts become coaxial with the output shaft of the motor.

Since the harmonic a reduction gear can obtain reduction ratio of about 1/several tens to 1/hundred by one stage, it has been caused to sufficiently become compact as compared to the gear box by which the same reduction ratio can be obtained. However, since the harmonic reduction gear is used in such a manner that it is disposed at the front surface of the motor in the state where the input/output shafts are caused to be concentric with respect to the output shaft of the motor, it cannot be avoided that the length in the output shaft direction of the drive system including the reduction gear and the motor is elongated.

In addition, since the harmonic reduction gear requires parts such as flex-in-belt and/or elliptical bearing, and so forth for which special precision processing is required, not only manufacturing is difficult, but also the cost is increased. Thus, apparatuses using such reduction gear would become expensive.

BRIEF SUMMARY OF THE INVENTION

An object of this invention is to provide a novel motor apparatus with a reduction gear capable of eliminating the problems with the conventional motor with a reduction gear.

Another object of this invention is to provide a motor apparatus with a reduction gear in which the configuration is simplified, the entirety of the apparatus is caused to become compact, and high reduction gear ratio can be obtained.

A further object of this invention is to provide a motor apparatus with a reduction gear capable of driving a drive body in the state where it is precisely subjected to positioning.

A still further object of this invention is to provide a motor apparatus with a reduction gear in which noise takes places to a slight degree and occurrence of back-lash resulting from meshing between gears can be suppressed.

A motor apparatus with a reduction gear according to this invention is directed to a motor apparatus with a reduction gear in which a motor portion is disposed about the axis of the center shaft and a reduction gear portion is disposed at the outer circumferential surface thereof. Namely, this motor apparatus comprises: a motor portion composed of a stator coil disposed at the periphery of the center shaft, a rotational body rotatably supported on the center shaft, and a magnet attached to the rotational body in a manner opposite to the stator coil; and a reduction gear portion composed of a first ring disposed with the center thereof being caused to be substantially in correspondence with the center of rotation of the rotational body, at the outer periphery of the rotational body, a second ring rotatably supported with respect to the first ring with the center thereof being caused to be substantially in correspondence with the center of Potation of the rotational body, a plurality of shafts disposed at substantially equal intervals on the circumference with the center of rotation of the rotational body being as the center, and a plurality of planetary gears respectively rotatably attached at these shafts, wherein a portion of the planetary gears is rotated along the inner circumferential surface of the first ring, and the other portion of the planetary gears is rotated along the inner circumferential surface of the second ring.

Abrasion processing is implemented to the inner circumferential surfaces of the first and second rings constituting the reduction gear portion, or friction (abrasion) members are provided thereat to thereby form friction surfaces, whereby the planetary gears are rotated along the inner circumferential surfaces of the first and second rings in the state where the friction surfaces are caused to be in contact with the outer circumferential surfaces of the planetary gears.

Moreover, the motor apparatus with reduction gear according to this invention is such that teeth are formed at the inner circumferential surfaces of the first and second rings constituting the reduction gear portion, and a plurality of gear portions having different numbers of teeth are formed at the respective planetary gears, thus to rotate the planetary gears along the inner circumferential surfaces of the first and second rings in the state where the teeth of the first and second rings and the gear portions of the respective planetary gears are caused to be meshed with each other.

Further, the motor apparatus with reduction gear according to this invention is such that timing belts having teeth formed thereon are attached to the inner circumferential surfaces of the first and second rings constituting the reduction gear portion, and gear portions corresponding to the teeth of the timing belts are formed at the respective planetary gears to rotate the planetary gears along the inner circumferential surfaces of the first and second rings in the state where the teeth of the first and second rings and the teeth of the planetary gears are caused to be meshed with each other.

In addition, the magnet of the rotational body and the stator coil constituting the motor portion are disposed in a manner opposite to the axial direction of the center shaft.

BEST MODE FOR CARRYING OUT THE INVENTION

A first embodiment of a motor apparatus with reduction gear according to this invention will now be described with reference to FIGS. 1 to 5.

Figure 1:
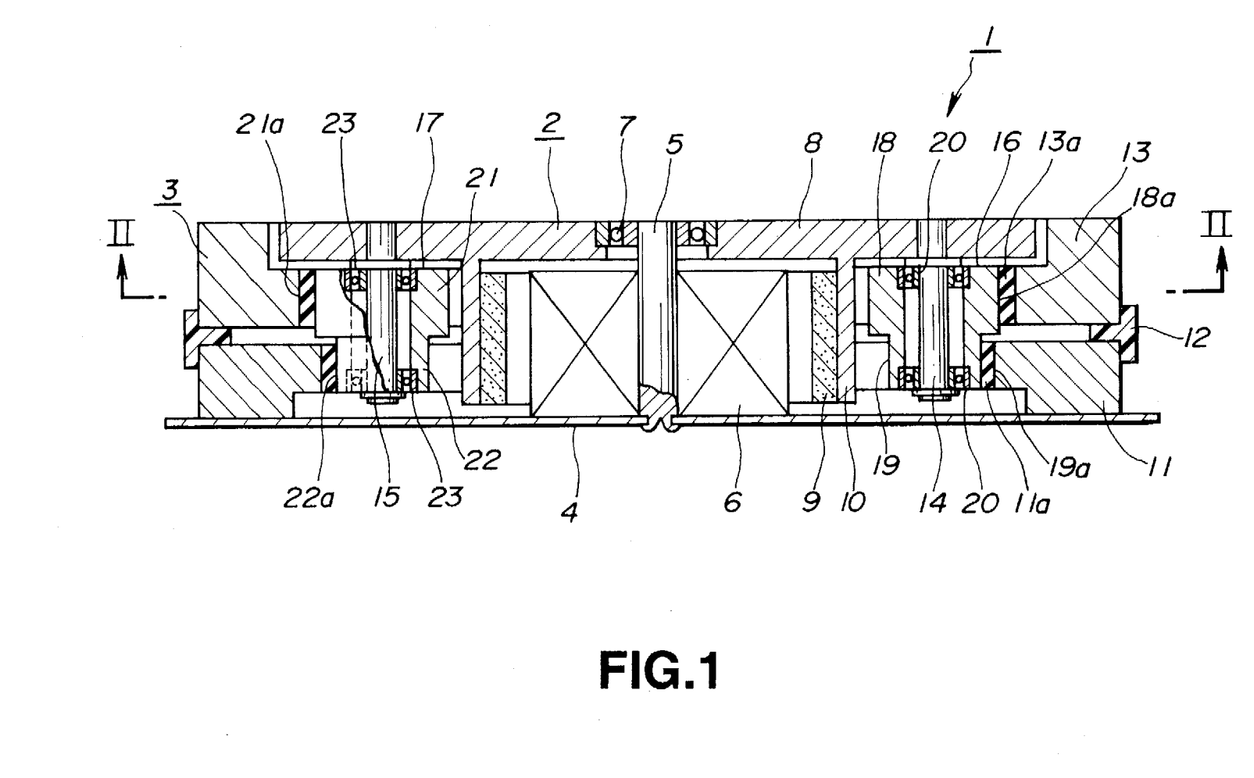
FIG. 1 is a cross sectional view showing a first embodiment of a motor apparatus with reduction gear according to this invention.

The motor apparatus 1 with reduction gear of this embodiment is constituted in a flattened substantially cylindrical form as shown in FIG. 1 such that a motor portion 2 and a reduction gear portion 3 are integrated with each other, and the dimension in the motor axis direction is caused to be smaller than the dimension in the radial direction thereof.

The motor portion 2 constituting the motor apparatus 1 with a reduction gear is composed, as shown in FIG. 1, of a stator coil 6 for generation of rotary magnetic field disposed around a center shaft 5 vertically provided on a stator base (substrate) 4, a rotor plate 8 rotatably provided through a bearing 7 at the end portion of the center shaft 5, and a magnet 9 disposed at the rotor plate 8 in the state opposite to the outer circumferential surface of the stator coil 6.

The stator base 4 is used as a base (substrate) for attaching (mounting) the motor apparatus 1 onto an equipment such as robot, and so forth, and further functions as a supporting table for the stator coil 6 and/or an attachment base for a ring which will be described later.

In this example, the center shaft 5 is formed by metal, and one end portion thereof is fixed at the stator base 4 by caulking or screw, and so forth.

The rotor plate 8 is formed in a circular plate form by metal which is a magnetic material, and the central portion thereof is supported at the center shaft 5 through the bearing 7. Further, a magnet attachment portion 10 having a cylindrical shape is formed in a manner to hang down at the surface side opposite to the stator base 4 of the rotor plate 8 and the magnet 9 is attached by bonding, and so forth, at the inner circumferential surface of the attachment portion 10.

The reduction gear portion 3 is composed of a fixed ring 11 fixedly disposed at the stator base 4 so that the center axis thereof is positioned at the center axis of the center shaft 5, a retainer 12 attached at the outer peripheral edge of the fixed ring 11, a rotational ring 13 disposed so that the center axis thereof is caused to be in correspondence with the center axis of the center shaft 5 and rotatably supported on the retainer 12, and first and second planetary gears 16, 17 respectively rotatably attached at two shafts 14, 15 vertically provided in a manner to hang down at the side of the surface opposite to the stator base 4 of the rotor plate 8.

The fixed ring 11 is formed by metal or synthetic resin, and so forth, and the portion closer to the outer circumferential edge is fixed on the stator base 4. Further, the retainer 12 is formed in a ring form by using synthetic resin material having a small friction coefficient such as Teflon (Trade Name), and so forth. This retainer 12 is fitted at the side of the outer circumferential surface which is the plane surface perpendicular to the plane surface opposite to the stator base 4 of the fixed ring 11.

The rotational ring 13 is formed by metal or synthetic resin, and so forth, wherein its outside diameter is caused to be substantially the same as the outside diameter of the fixed ring 11 and its inner diameter is caused to be slightly greater than the inside diameter of the fixed ring 11.

Figure 3:
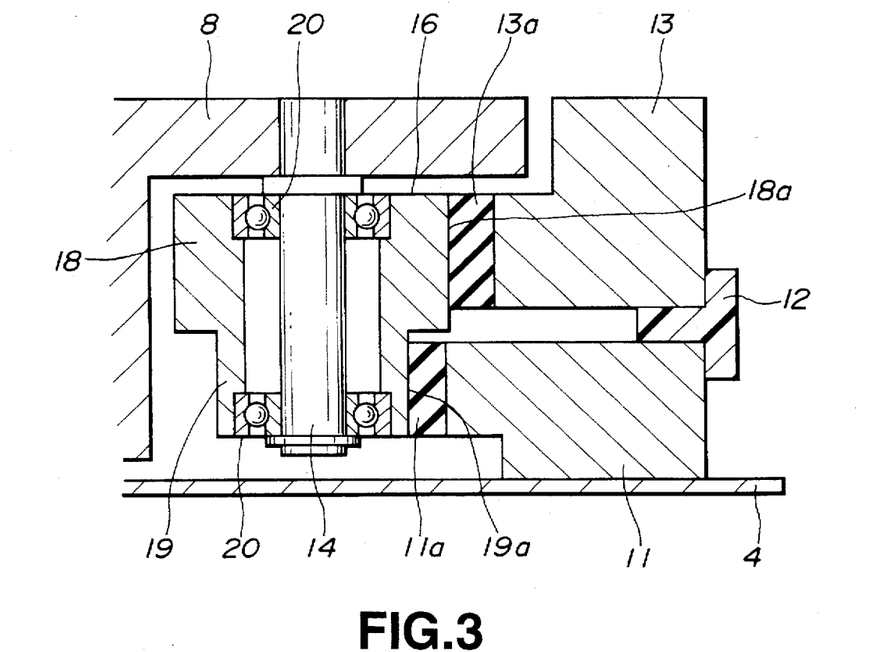
FIG. 3 is a cross sectional view of the essential part showing the state where the planetary gear and the ring are in contact with each other.

At the inner circumferential surfaces of these rings 11, 13, belt-shaped members formed by material having a high friction coefficient such as rubber system material, and so forth are stuck over the entire circumference as shown in FIG. 3. Thus, guide portions 11a, 13a are respectively formed. It is to be noted that, in place of providing a friction member on the inner circumferential surface of the ring as stated above, such a processing to enhance the friction force such as knurling, etc. may be implemented onto the inner circumferential surface thereof.

Figure 2:
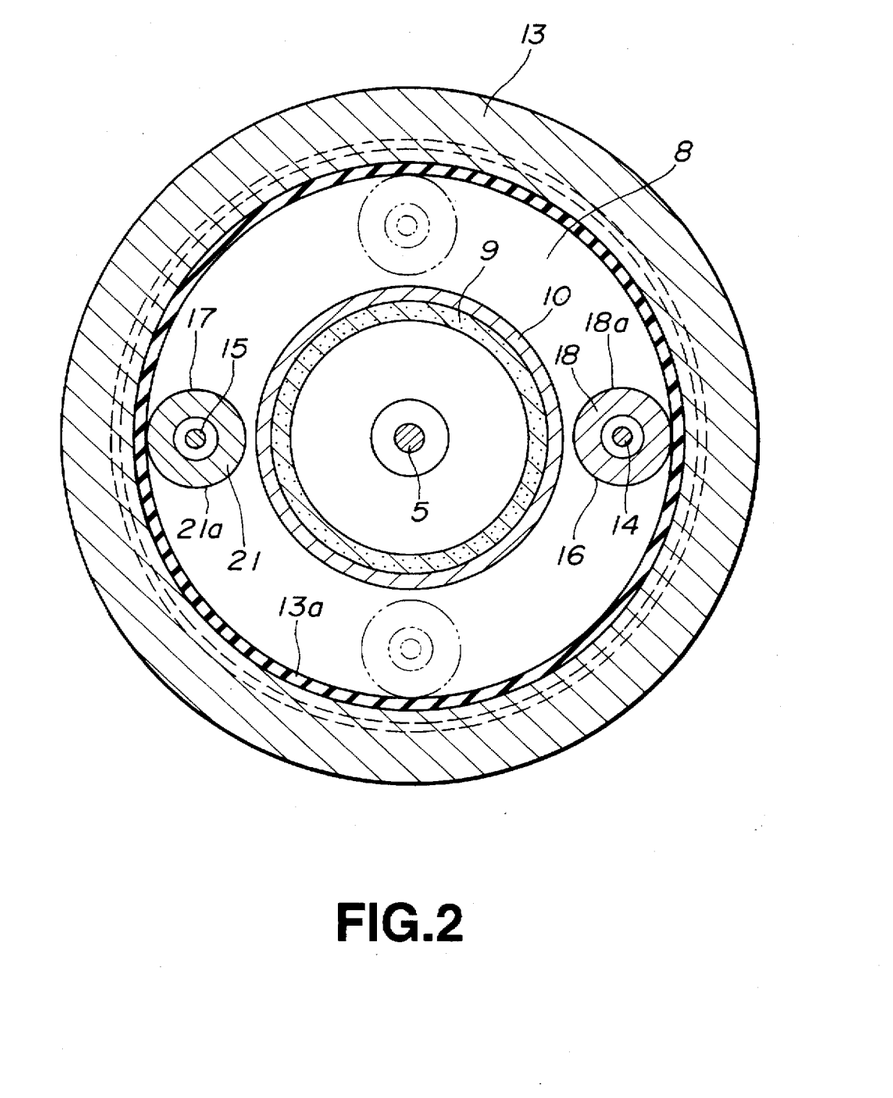
FIG. 2 is a cross sectional view taken along the II—II lines of FIG. 1.

The shafts 14, 15 are both formed by metal. As shown in FIG. 2, these shafts are disposed symmetrically with the center shaft 5 being put therebetween, i.e., with angular intervals of 180 degrees about the axis of the center shaft 5. In this case, with respect to the number of provisions of shafts 14, as indicated by phantom lines in FIG. 2, when the number of provisions is generally assumed to be n ($\geq 2$), shafts can be disposed with angular intervals of 360 degrees/n about the center shaft 5.

The first and second planetary gears 16, 17 are formed by metal, and two guided surfaces respectively guided along the rings 11, 13 are formed at these outer circumferential surfaces.

The first planetary gear 16 is of a structure as shown in FIG. 3 in which a first roller portion 18 formed at the rotor plate 8 side and a second roller portion 19 formed at the stator base 4 side are coaxially integrally formed, wherein the first roller portion 18 is formed so as to have a diameter greater than that of the second roller portion 19. Further, the first planetary gear 16 is guided along these rings 11, 13 in the state where an outer circumferential surface 18a of the first roller portion 18 is caused to be in contact with the guide portion 13a of the rotational ring 13, and an outer circumferential surface 19a of the second roller portion 19 is caused to be in contact with the guide portion 11a of the fixed ring 11. In this example, two bearings 20, 20 are provided within the first planetary gear 16. Namely, the first planetary gear 16 is rotatably supported by the metallic shaft 14 through these bearings 20, 20, and the first planetary gear 16 is adapted so that the first and second roller portions 18 and 19 thereof are rotated in one body about the axis of the shaft 14.

The second planetary gear 17 is also of a structure similar to the first planetary gear 16, and the second planetary gear 17 is of a structure in which a first roller portion 21 formed at the rotor plate 8 side and a second roller portion 22 formed at the stator base 4 side are formed in one body, wherein the first roller portion 21 is formed so as to have a diameter greater than that of the second roller portion 22. Further, the second planetary gear 17 is guided along these rings 11, 13 in the state where an outer circumferential surface 21a of the first roller portion 21 is caused to be in contact with the guide portion 13a of the rotational ring 13 and an outer circumferential surface 22a of the second roller portion 22 is caused to be in contact with the guide portion 11a of the fixed ring 11. In this example, two bearings 23, 23 are provided within the second planetary gear 17, and the second planetary gear 17 is rotatably supported at the metallic shaft 15 through these bearings 23, 23. Namely, the second planetary gear 17 is adapted so that the first and second roller portions 21 and 22 are rotated in one body about the axis of the shaft 15.

Thus, in the motor 1 with a reduction gear of this embodiment, when a drive current is delivered to the stator coil 6 in the motor portion 2, the rotor plate 8 is rotated by action between current flowing in the stator coil 6 and magnetic field from the magnet 9 disposed at the rotor plate 8 side. As a result, rotational force thereof is transmitted to the rotational ring 13 through the first and second planetary gears 16, 17. Thus, the number of rotations is reduced. Namely, when the rotor plate 8 is rotated, the second roller portions 19, 22 of the first and second planetary gears 16, 17 revolve while turning on their axes along the guide portion 11a of the fixed ring 11, and the first roller portions 18, 21 revolve while turning on their axes in one body with the second roller portions 19, 22. Further, when the rotational ring 13 caused to be in contact with the first roller portions 18, 21 is rotated, the number of rotations of the motor portion 2 is reduced. Thus, the reduced number of rotations is outputted to the rotational ring 13. The reduction ratio in this case is prescribed (determined) by the outside diameter, and so forth of the roller portion of the planetary gear.

Figure 4:
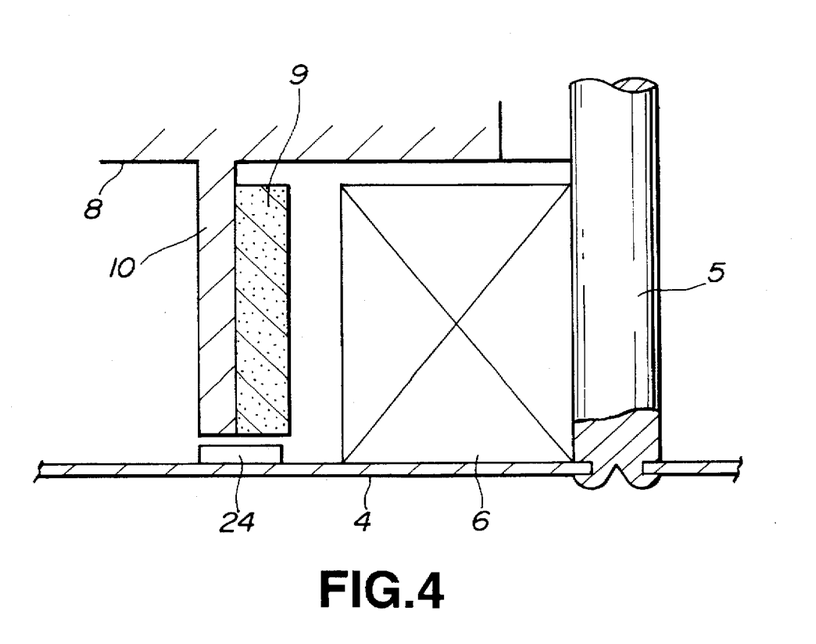
FIG. 4 is a cross sectional view of the essential part showing attachment position of encoder sensor.

It is to be noted that, in order to more precisely carry out rotational control of the rotor plate 8, an encoder sensor 24 may be disposed at the portion opposite to the magnet 9 of the stator base 4 as shown in FIG. 4 to magnetically detect the number of rotations of the magnet 9.

As described above, in the motor apparatus 1 with a reduction gear of this embodiment, there is employed a structure using first and second planetary gears 16, 17 revolving along the fixed ring 11 and the rotational ring 13, thereby making it possible to dispose the motor portion 2 about the axis of the center shaft 5, and to dispose the reduction gear portion 3 at the outer circumference of the motor portion 2. Accordingly, the heights of the motor portion 2 and the reduction gear portion 3 in the axial direction of the center shaft 5 can be as minimum as possible. Namely, thicknesses of the fixed ring 11 and/or the rotational ring 13 are reduced, and thicknesses of the first and second planetary gears 16, 17 in the axial direction of the shafts 14, 15 are reduced, thereby permitting the thickness of the motor with reduction gear to be smaller. Further, no special processing is required for constituent parts such as planetary gears and/or rings, etc. In addition, there is also the merit that the number of parts is relatively small.

While, in the above described embodiment, bearings 20, 23 are used as the bearing to support first and second planetary gears 16, 17 at shafts 14, 15, when metal bearing (including oil) or sleeve formed by material of hardness and good smoothness, e.g., polyacetal resin (POM), and so forth is used as the bearing, the thickness of the planetary gear can be further reduced.

Figure 5:
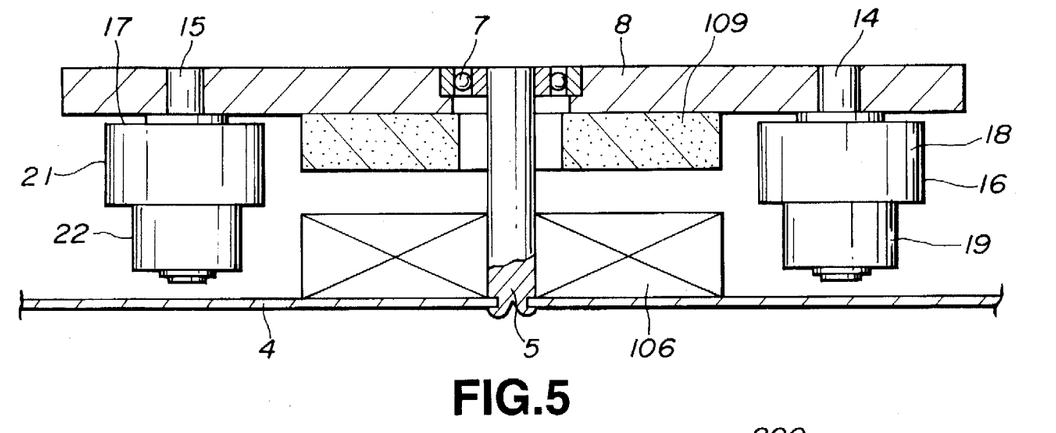
FIG. 5 is a cross sectional view showing another arrangement example of magnet and stator coil.

While, in this embodiment, stator coil 6 and magnet 9 are disposed in concentric circular form with the axis of the center shaft 5 being as the center, a stator coil 106 and a magnet 109 are disposed as shown in FIG. 5 so that the surfaces opposite to each other are caused to be in parallel to the plane surface perpendicular to the axis direction of the center shaft 5, thereby permitting the motor apparatus 1 with reduction gear to be of thinner structure. Namely, magnet 109 in a thin plate form is fixed by bonding, and so forth at the central portion of the plane surface opposite to the stator base 4 of the rotor plate 8, and stator coil 106 is disposed on the stator base 4 in a manner opposite to the magnet 109. Thus, the motor portion 2 is constituted as a plane surface opposite type motor portion. In accordance with this structure, the thicknesses of the magnet 109 and/or the stator coil 106 are caused to be as thin as possible, thereby permitting the thickness of the motor apparatus 1 with reduction gear to be small.

Figure 6:
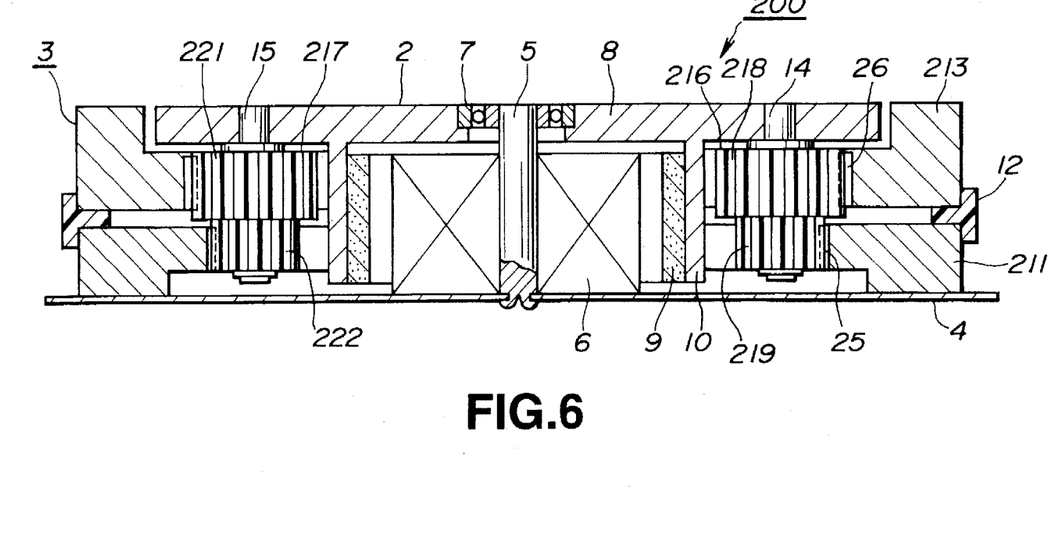
FIG. 6 is a cross sectional view showing a second embodiment of the motor apparatus with reduction gear according to this invention.
Figure 7:
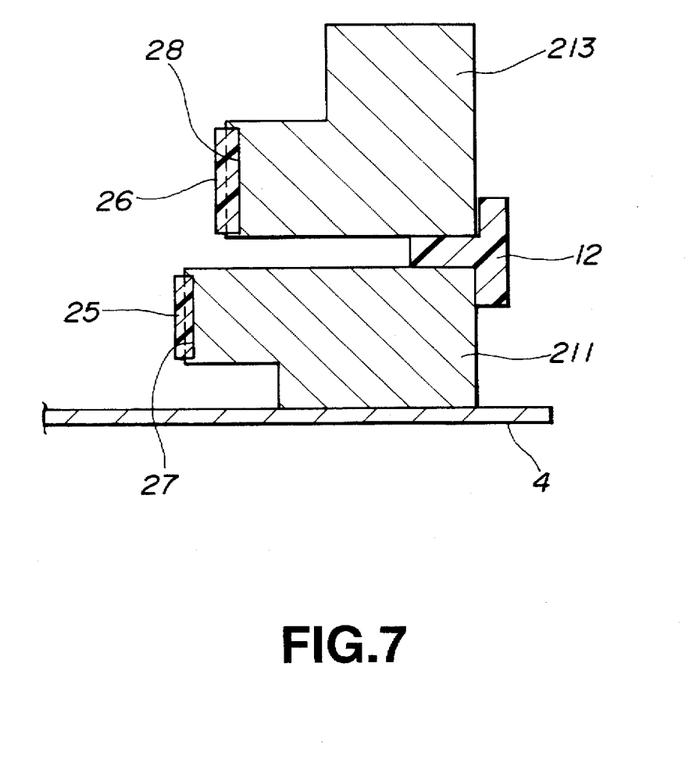
FIG. 7 is a cross sectional view of the essential part showing the state where timing belts are stuck in stationary ring and rotational ring.

A motor 200 with reduction gear according to a second embodiment of this invention will now be described with reference to FIGS. 6 and 7.

It is to be noted that since the second embodiment includes components similar to those of the first embodiment at many portions except that the second embodiment mainly differs from the previously described first embodiment in that an engagement structure between the inner teeth of the ring members and the planetary gears is employed, common reference numerals are respectively attached to the portions common to those of the first embodiment and their detailed explanation will be omitted.

A fixed ring 211 and a rotational ring 213 may be an inner tooth gear obtained by forming involute tooth form at the respective inner circumferential surfaces thereof. However, there is the problem in point of noise or back-lash. For this reason, in this embodiment, timing belts 25, 26 are respectively stuck over the entirety of the respective inner circumferential surfaces. For example, as shown in FIG. 7, it is sufficient for this purpose to respectively form grooves 27, 28 at the inner circumferential surfaces of the fixed ring 211 and the rotational ring 213 to fit timing belts 25, 26 formed by elastic (resilient) material into these grooves 27, 28 to bond them.

For first and second planetary gears 216, 217, timing pulleys corresponding to the tooth form or the pitch of the timing belts 25, 26 are used.

Namely, the first planetary gear 216 is of a structure in which a first toothed portion 218 formed at the rotor plate 8 side and a second toothed portion 219 formed at the stator base 4 side are coaxially formed in one body, wherein the first toothed portion 218 is formed so as to have a diameter greater than that of the second toothed portion 219. Further, the first toothed portion 218 is meshed with the timing belt 26 of the rotational ring 213, and the second toothed portion 219 is meshed with the timing belt 25 of the rotational ring 211.

Similarly to the first planetary gear 216, the second planetary gear 217 is also of a structure in which a first toothed portion 221 formed at the rotor plate 8 side and a second toothed portion 222 formed at the stator base 4 side are coaxially formed in one body, wherein the first toothed portion 221 is formed so as to have a diameter greater than that of the second toothed portion 222. Further, the first toothed portion 221 is meshed with the timing belt 26 of the rotational ring 213, and the second toothed portion 222 is meshed with the timing belt 25 of the rotational ring 211.

Thus, in the motor apparatus 200 with a reduction gear of the second embodiment, when the rotor plate 8 is rotated, the second toothed portions 219, 222 of the first and second planetary gears 216, 217 are meshed with the timing belt 25 of the fixed ring 211 to revolve while turning on their axes. As a result, the first toothed portions 218, 221 revolve while turning on their axes in one body with the second toothed portions 219, 222. Further, when the rotational ring 213 meshed with the first toothed portions 218, 221 is rotated, the number of rotations of the motor portion 2 is reduced. Thus, the reduced number of rotations is outputted to the rotational ring 213.

It is to be noted that the reduction ratio in this case is determined by the ratio between the numbers of teeth of the first and second toothed portions 218, 219 of the first planetary gear 216 and the ratio between the numbers of teeth of the first and second toothed portions 221, 222. Although the detail of the method of calculating the reduction ratio is omitted, the reduction ratio can be determined by taking into consideration the relationship derived resulting from the fact that the number of planetary gears is 2, i.e., the fact that difference between the numbers of teeth of the toothed portions is multiple of 2, or the like. For example, reduction ratio of about 1/20~1/80 can be realized by setting of the number of teeth.

In the above-described second embodiment, timing belts 25, 26 are stuck onto the ring inner circumferential surfaces and planetary gears 216, 217 corresponding to the timing pulley are used to thereby solve the problem of back-lash. In addition, the timing belts 25, 26 are formed by material having elasticity of the rubber system. Accordingly, silent and smooth reduction of speed (number of rotations) can be realized. Further, since tension is hardly applied to the timing belt itself at the time of the operation of the motor 200 with reduction gear, and pressing force from the planetary gear to the timing belt is received by the ring, improvement in durability and/or load ability can be made.

It is to be noted that, although not shown, also in this embodiment, there is employed such a device to allow the arrangement of the stator coil and/or the magnet constituting the motor portion to be the so-called plane surface opposite type arrangement as explained with reference to FIG. 5, or the like, thereby permitting the motor with reduction gear to be of the thinner type.

Industrial Applicability

In accordance with the motor apparatus with reduction gear according to this invention, since the motor portion is disposed about the axis of the center shaft and the reduction gear portion is disposed at the outer circumference thereof. Accordingly, the entirety of the apparatus can be caused to become compact, and a higher reduction ratio can be obtained.

Further, since the first and second rings and the planetary gears constituting the reduction gear portion are coupled (connected) by friction force, a less occurrence of noise results, and occurrence of back-lash resulting from meshing between gears can be suppressed.

Furthermore, in accordance with the motor apparatus with a reduction gear according to this invention, the first and second rings and the planetary gears constituting the reduction gear portion are coupled by the timing belts, thereby making it possible to realize silent and smooth reduction of speed. In addition, the timing belt is formed by material having elasticity (resiliency) such as rubber, etc., thereby permitting occurrence of noise to be further decreased.

What is claimed is:

1. A motor apparatus with reduction gear, comprising: a motor portion composed of a stator coil disposed at the periphery of a center shaft, a rotational body rotatably supported by the center shaft, and a magnet attached to the rotational body in a manner opposite to the stator coil; and a reduction gear portion composed of a first ring disposed at the outer periphery of the rotational body with the center thereof being caused to be substantially in correspondence with the center of rotation of the rotational body, a second ring rotatably supported with respect to the first ring with the center thereof being caused to be substantially in correspondence with the center of rotation of the rotational body, a plurality of shafts disposed at substantially equal intervals on the circumference with the center of rotation of the rotational body being as the center, and a plurality of planetary gears respectively rotatably attached on these shafts, wherein a portion of the planetary gears is rotated along the inner circumferential surface of the first ring, and the other portion of the planetary gears is rotated along the inner circumferential surface of the second ring;

wherein the inner circumferential surfaces of the first and second rings are abrasive, or friction members are provided thereat, thereby to form friction surfaces, whereby the planetary gears are rotated along the inner circumferential surfaces of the first and second rings in the state where the friction surfaces are caused to be in contact with the outer circumferential surfaces of the planetary gears.

2. A motor apparatus with reduction gear as set forth claim 1, wherein teeth are formed at the inner circumferential surfaces of the first and second rings, and a plurality of gear portions having different numbers of teeth are formed at the respective planetary gears, whereby the planetary gears are rotated along the inner circumferential surfaces of the first and second rings in the state where the teeth of the first and second rings and the gear portions of the respective planetary gears are meshed with each other.

3. A motor apparatus with reduction gear, comprising: a motor portion composed of a stator coil disposed at the periphery of a center shaft, a rotational body rotatably supported by the center shaft, and a magnet attached to the rotational body in a manner opposite to the stator coil; and a reduction gear portion composed of a first ring disposed at the outer periphery of the rotational body with the center thereof being caused to be substantially in correspondence with the center of rotation of the rotational body, a second ring rotatably supported with respect to the first ring with the center thereof being caused to be substantially in correspondence with the center of rotation of the rotational body, a plurality of shafts disposed at substantially equal intervals on the circumference with the center of rotation of the rotational body being as the center, and a plurality of planetary gears respectively rotatably attached on these shafts, wherein a portion of the planetary gears is rotated along the inner circumferential surface of the first ring, and the other portion of the planetary gears is rotated along the inner circumferential surface of the second ring;

wherein timing belts having teeth formed thereon are attached to the inner circumferential surfaces of the first and second rings, and gear portions corresponding to the teeth of the timing belts are formed at the respective planetary gears, whereby the planetary gears are rotated along the inner circumferential surfaces of the first and second rings in the state where the teeth of the first and second rings and the teeth of the planetary gears are meshed with each other.

4. A motor apparatus with reduction gear as set forth in any one of claims 1, 2 or 3, wherein the magnet of the rotational body and the stator coil are arranged in a manner opposite to the axial direction of the center shaft.

* * * * *